United States Patent [19]

Hurvig

[11] Patent Number: 5,628,005

[45] Date of Patent: May 6, 1997

[54] SYSTEM AND METHOD FOR PROVIDING OPPORTUNISTIC FILE ACCESS IN A NETWORK ENVIRONMENT

[75] Inventor: Hans Hurvig, Kirkland, Wash.

[73] Assignee: Microsoft Corporation, Redmond, Wash.

[21] Appl. No.: 478,454

[22] Filed: Jun. 7, 1995

[51] Int. Cl.⁶ .......................... G06F 12/00; G06F 17/30
[52] U.S. Cl. .......................... 395/608; 395/462; 395/726; 395/610
[58] Field of Search .................. 395/600, 200.09, 395/200.12, 200.14, 427, 440, 445, 448, 462, 468, 726, 650

[56] References Cited

U.S. PATENT DOCUMENTS

| | | | |
|---|---|---|---|
| 4,399,504 | 8/1983 | Obermarck et al. | 364/200 |
| 4,887,204 | 12/1989 | Johnson et al. | 364/200 |
| 5,202,971 | 4/1993 | Henson et al. | 395/425 |
| 5,261,051 | 11/1993 | Masden et al. | 395/200 |
| 5,349,642 | 9/1994 | Kingdon | 380/25 |
| 5,410,697 | 4/1995 | Baird et al. | 395/650 |
| 5,452,447 | 9/1995 | Nelson et al. | 395/650 |
| 5,493,728 | 2/1996 | Solton et al. | 395/250 |
| 5,513,314 | 4/1996 | Kandasamy et al. | 395/182.04 |
| 5,560,008 | 9/1996 | Johnson et al. | 395/650 |

OTHER PUBLICATIONS

Mahadev Satyandrayanan et al., "Scalable, Secure and Highly Available Distributed File Access," *Computer*, May 1990, pp. 9–21.

"Novell's NetWare Core Protocol" by P. Szczerbina, *Dr. Dobb's Journal*, Nov. 1993, pp. 123–132.

*Primary Examiner*—Paul V. Kulik
*Attorney, Agent, or Firm*—Leydig, Voit & Mayer, Ltd.

[57] ABSTRACT

A file allocation and management system for a multi-user network environment is disclosed. At least one server and two or more clients are disposed along the network in communicating via a request/response transfer protocol. Files directed for shared usage among the clients along the network are stored at the server. Each client is adapted to communicate with the server through a plurality of identifier sockets, wherein a first identifier socket is configured for bi-directional communication and a second identifier socket is configured for uni-directional communications initiated by the server. Files normally stored at the server, under appropriate circumstances may be temporarily stored in an internal cache or other memory at each client location, when the file is in use.

12 Claims, 9 Drawing Sheets

Response Packet

| | |
|---|---|
| Packet Type | (2 bytes) |
| Packet Sequence Number | (1 byte) |
| Server Connection Number, low | (1 byte) |
| Server Task Number | (1 byte) |
| Server Connection Number, high | (1 byte) |
| Completion Code | (1 byte) |
| Connection Status | (1 byte) |
| Response Data (Variable Length) | |

FIG. 3B

Request Packet

| | |
|---|---|
| Packet Type | (2 bytes) |
| Packet Sequence Number | (1 byte) |
| Server Connection Number, low | (1 byte) |
| Client Task Number | (1 byte) |
| Server Connection Number, high | (1 byte) |
| Function Code | (1 byte) |
| Subfunction Length (if applicable) | (2 bytes) |
| Subfunction Code (if applicable) | (1 byte) |
| Request Data (Variable Length) | |

FIG. 3A

SYSTEM AND METHOD FOR PROVIDING OPPORTUNISTIC FILE ACCESS IN A NETWORK ENVIRONMENT

BACKGROUND OF THE INVENTION

1. Field of the Art

The present invention relates generally to shared resource allocation in a multi-user networking environment, and more particularly, to a system providing opportunistic file access control over shared resources in a multi-user networking environment.

2. Discussion of the Related Art

A typical computer networking system consists of a number of individual nodes, including at least one server node and two or more client nodes, interconnected through a network link. Broadly, the server manages resources directed for shared usage among a number of clients on the network. More specifically, a file server manages a disk or other device for storing files to be shared by various clients throughout the network.

As is known by persons of ordinary skill in the art, a bottleneck in networking environments is the network link that interconnects the nodes. The primary reason for this bottleneck is the bandwidth of the physical medium comprising the network link—whether it is twisted-pair, coax, or fiber-optic cabling—as the bandwidth determines the maximum rate that data can be communicated across the link. Reducing the number and amount of data transfers across the network link will correspondingly lessen the deleterious effects of the bottleneck and, accordingly, enhance overall network system performance.

One known way to reduce the number of network transfers is to temporarily store files retrieved from a file server in the retrieving client's local memory space, usually a cache memory. When a client requests multiple or repeated access to a file stored on a file server, that file is written into the requesting client's local cache until that client is finished with the file, at which time the file is written back to the server (if changed). In this manner, overall system performance is improved by eliminating unnecessary intermediate file transfers over the network. In the context of the present invention, and as used herein, the term "file" refers to any collection of information or data regardless of size or whether the information or data is merely a portion or subset of a larger collection of information or data, e.g. sectors, blocks, records or the like.

Problems arise, however, when two or more clients need access to the same file stored at the server, and one or more clients need read-write access to that file. To provide a simple illustration of this problem, suppose client A and client B both retrieve the same file from a server for read-write access, whereby the same file is simultaneously residing in the local caches of both client A and client B. Assume further that both clients make modifications to the file. If client A writes the file back to the server first, when client B writes the file back to the server, the changes made by client A will be destroyed. Moreover, client A will be unaware that its changes were overwritten.

The same problem, although not as obvious, can arise where multiple clients have retrieved a file into their local cache, but just one client has requested read-write access. For example, suppose that client A retrieves a file for read-write access and makes certain modifications to the file, but retains the file in its local cache for further use. At some time later, client B retrieves the file for read-only access. It should be appreciated that the file, as retrieved by client B, is in its original state, since the modifications made by client A have not yet been written back to the server. The earlier modifications made by client A to the file are not apparent to client B and may have potentially disastrous effects, depending of course, upon the particular application running at client B.

A similar problem arises if client A retrieves a file for read-only access. At some later time client B retrieves the file with read-write access and makes modifications to the file. These modifications are transparent to client A, which is still operating with the original file contents in its cache.

It can be appreciated from the foregoing description that some type of file or resource management system must be implemented at the server to maintain the integrity of the files centrally stored at the server location. Indeed, some systems have solved this problem by providing an absolute lock at the file server, permitting only one client (having read-write authorization) access to a file at any given time. That one client must, therefore, write the file back to the server before another client is allowed to access the file. The problem, however, created in this type of system is that a second client requesting access to a locked file has no indication of when the file will be released by the client having present access to the file. Accordingly, it is further desired to provide a system having a way of forcing a client to release control of a file that it has retrieved into its local cache.

This problem is broadly addressed by U.S. Pat. No. 4,887,204 ('204 patent) to Johnson et al., and assigned to International Business Machines Corporation (IBM®). The '204 patent solves this problem by providing a plurality of "synchronization modes". Specifically, three synchronization modes are provided. The system of the '204 patent operates in a first synchronization mode (A_synch mode) when a file is being accessed by a single client with read-write authorization. The system operates in a second synchronization mode (Read_only mode) when one or more clients have accessed a file, each with read-only authorization. Finally, the system operates in a third synchronization mode (Full_synch mode) when multiple clients have access to a common file, and at least one client has retrieved the file with read-write authorization.

In either the A_synch or Read_only modes mentioned above, the file is transmitted from the server into the local cache of each client having access to that file. In the Full_synch mode, however, the shared file is maintained at the server, so that any read or write operation must take place through transfers over the network. Although operations in this mode necessarily degrade the network performance, the mode nevertheless provides an effective way of maintaining file integrity while allowing multiple client file access.

The '204 patent further describes the dynamics of the synchronization modes as multiple clients request and release access to various files in the network environment. For example, if client A is the first client to access a file from the server and requests read-write access to that file, then that file is transferred to client A's local cache in the A_synch mode. If at some later time client B requests the same file for read-only access, then the server requests client A to change to the full-synchronization mode (See col. 21 lines 19–22). Client A responds by flushing that file from its local cache and writing back to the server any portions of the file that were changed by client A. At this point, both client A and client B must access the file, which will be maintained at the server, over the network link. If at some later time client A has completed operations on the file, it instructs the server that it is finished. The file's synchronization mode is then changed to Read_only, and the file is transferred from the server to client B's local cache. Subsequent reads from client B then can be accommodated locally, without requiring transfers over the network link.

The above solution, while workable, has certain drawbacks and deficiencies. More specifically, the '204 patent addresses the shared resource management problem in the broad sense by assuming, for purposes of that invention, free two-way communication between the server and clients. Indeed, columns 20–22 discuss changing from A_synch to Full_synch and from Read_only to Full_synch synchronization modes. In each of these instances, it is assumed that the server has direct command control over each client (See col. 21, lines 19–21 and col. 22 lines 12–15), whereby the server may direct a client to release a file residing in its local cache. The file management as taught by the '204 patent, wherein a file lock at a client may be broken, is often referred to as an opportunistic lock.

However, present systems are known that employ a "ping pong," or request/response, transfer protocol of information exchange between client and server. In such systems, command sequences are initiated by the client, whereby a client submits a command or request to the server and then awaits the server's response. If a client has not initiated a request of the server, it has no reason to monitor the network link and may therefore ignore commands initiated by the server. Accordingly, the server generally cannot unilaterally command a client to release its control of a particular file.

To more particularly illustrate this problem, suppose client A is the first client to request access from a file stored at the server, and requests to have such access with read-write authorization. Since no other client has contemporaneous access to this file, the file is transferred into client A's local cache. Later, client B requests access to the same file from the server. The server must then signal client A to release its exclusive access over the file and flush its local cache. However, in a system having a typical request/response transfer protocol, client A will not be listening to the network link and, thus, will not know of client B's desire to access the file. As a result, the operation at client B will either be suspended, or at least unduly slowed while client B awaits to receive the file from the server.

It can be appreciated from the foregoing discussion, that a need exists for a system to provide opportunistic access to a file in a system of the type having a request/response transfer protocol, whereby informational exchanges may be instituted upon a client's request, even if another client is presently accessing the same file.

SUMMARY OF THE INVENTION

Accordingly, it is a primary object of the present invention to provide an improved file management system having opportunistic file locks in a network environment having a request/response transfer protocol.

Another object of the present invention is to provide a file management system that minimizes the number of file transfers across the network.

Additional objects, advantages and other novel features of the invention will be set forth in the description that follows and will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, a preferred embodiment of the present invention is generally directed to a file allocation and management system for a multi-user network environment of the type having at least one server and two or more clients that communicate in a request/response transfer protocol. Files directed for time-multiplex shared usage are stored at the server. Each client is adapted to communicate with the server through a plurality of identifier sockets, wherein a first identifier socket is configured for bi-directional communication between the client and server, and a second identifier socket is configured for uni-directional communications initiated by the server. The bi-directional communications through the first identifier socket are initiated by a client request, consistent with the request/response transfer protocol. Each client further includes an internal cache memory for temporarily storing files that have been transmitted to the client across the network.

BRIEF DESCRIPTION OF THE DRAWINGS

The accompanying drawings incorporated in and forming a part of the specification, illustrate several aspects of the present invention, and together with the description serve to explain the principals of the invention. In the drawings:

FIGS. 3A and 3B show the record structure for both a request and response packet using the NCP protocol;

Reference will now be made in detail to the preferred embodiment of the present invention, which is illustrated in the accompanying drawings.

DETAILED DESCRIPTION OF THE PREFERRED EMBODIMENTS

A typical networking system comprises at least one server and two or more clients interconnected through a network link. For purposes of the present invention, the particular type of network link or style of network topology is irrelevant. Indeed, the International Standards Organization (ISO) has published specifications for their OSI reference model for layered data communications, which has become a standard framework for describing network communications systems. The ISO reference model is divided into seven layers, each defining a set of services and related protocols for handling messages at that layer.

Specifically, and as understood by persons of ordinary skill in the art, ISO's reference model defines the following seven layers: (1) physical; (2) data link; (3) network; (4) transport; (5) session; (6) presentation; and (7) application. This layering of functions and protocols provides the basis for communication between dissimilar types of network hardware and software, although not all networks are designed to fit neatly within this rigid structure. Since the concepts and teachings of the present invention generally fall within the transport through application layers, discussions of the operations taking place at the lowermost (e.g., physical, data link, and network) layers are not necessary for purposes of describing the present invention, as the operations at these levels are known to those skilled in the art and are transparent to the operations of the present invention.

Figure 1:
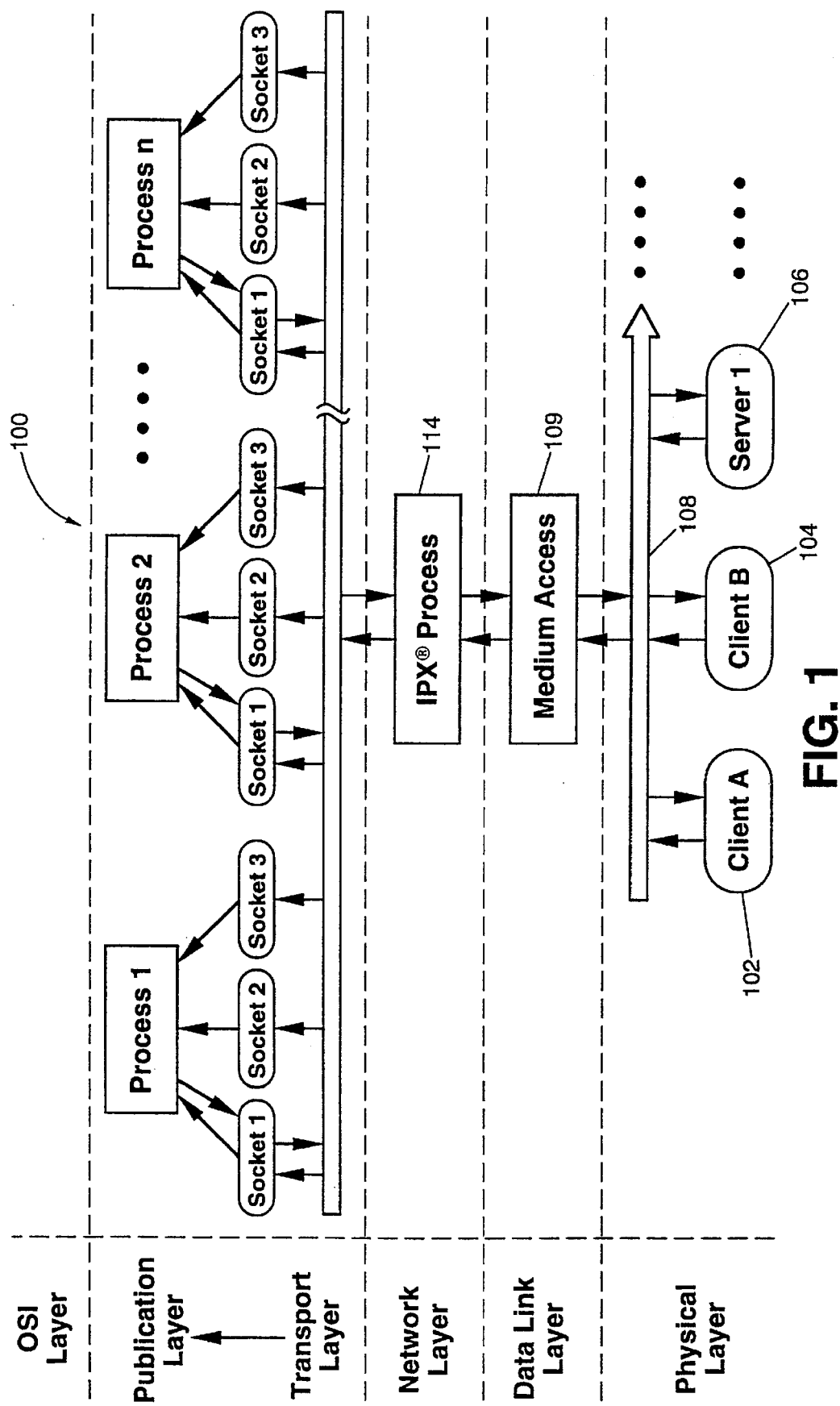
FIG. 1 is a schematic representation of a typical networking environment used by the preferred embodiment of the present invention depicting the Open Systems Interconnections (OSI) network layers.

Referring now to the figures, FIG. 1 shows a diagrammatic representation of a typical networking environment used by the present invention, and is generally designated as reference numeral 100. The physical hardware components reside at the lowermost OSI layer, or physical layer, and include the various nodes distributed along the network link or cabling. Although the term 'node' broadly refers to all types of physical devices attached to the network link, only client and server nodes are depicted in FIG. 1.

More specifically, FIG. 1 illustrates two clients 102, 104 and a single server 106, interconnected through a network link 108, although additional clients and servers, as well as other types of nodes, may be distributed along the network link as well. As used in this specification, the term 'client' will generally denote a user workstation of some type. The term 'server' can include any device directed for controlling and coordinating shared usage of a network resource, such as a storage disk or printer, but as used in this specification for describing the concepts and teachings of the present invention, unless otherwise indicated, it will refer to a file server.

Figure 2:
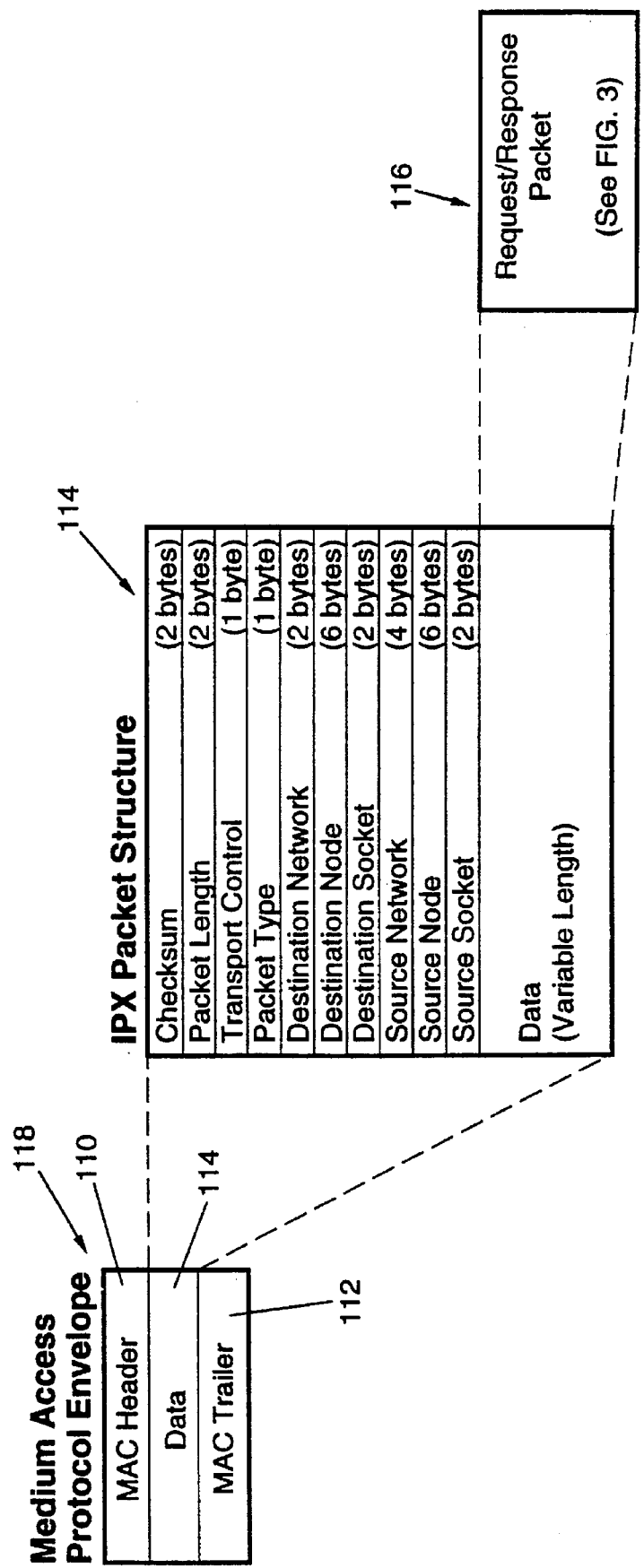
FIG. 2 is depicts the IPX® packet structure used to communicate over the network, and further shows the nesting of this packet between the medium access protocol envelope and the request/response packet.

The next OSI layer, the data link layer, is directed to the transmission of data streams that enable communication among the nodes at the physical layer, and is commonly referred to as medium access 109. Bits of information are typically arranged in logical units known as frames or envelopes 118 (See FIG. 2). These envelopes define the protocol which the physical nodes use to intercommunicate. Ethernet and Token Ring are examples of popular frame/physical protocols used in networking systems. Typically, the envelopes 118 are divided into segments including a header 110, a trailer 112, and a data segment. The header 110 includes information such as the physical address of the destination node, which enables any given node to direct a communication to another specified node number. The trailer 112 usually provides some type of parity or other data integrity check, to ensure proper data transmission. Finally, the data segment includes the information embedded and passed down from the higher OSI layers. (FIG. 2 depicts this successive data embedding)

The network layer builds on the data link layer and is directed to the routing of information packets among the physical nodes. In the preferred embodiment of the present invention, the Internetwork Packet Exchange (IPX®) 114, a Novell® protocol, is used to provide the network layer protocol. IPX® is a connectionless datagram protocol that provides services above the medium access layer. It is referred to as connectionless because no physical routing channel is established before transmitting the message. Instead, the message packet is formed and placed on the network link without ensuring whether it was ever received by the destination node. Any such guarantees for proper packet transmission must be provided by a higher level transport protocol. For more information on the IPX® protocol, reference is made to *NetWare The Professional Reference*, by Karanjit Siyan, 2nd ed. (Copyright 1993 by New Riders Publishing), which is hereby incorporated by reference.

One such higher level protocol is Netware Core Protocol (NCP), which was designed to run in conjunction with IPX®. Additional information regarding the NCP protocol can be found in an article by Pawel Szczerbina entitled "Novell's NetWare® Core Protocol," Dr. Dobb's Journal, November, 1993, pp. 123–132, which is herein incorporated by reference.

The preferred embodiment of the present invention uses the request/response transfer protocol of NCP. In this way, the present invention can be used in conjunction with higher level programmed applications, that are directed to the NCP environment.

More specific reference is now made to FIG. 2, which displays the IPX® packet structure and the nesting of information packets through progressive OSI layers. An NCP request/response 116 command packet, which will be discussed in greater detail in connection with FIGS. 3A and 3B, is nested within the IPX® packet 114, which is nested within the medium access protocol envelope 118. As illustrated, the IPX® packet format is primarily concerned with routing information, such as the packet source and destination. The specific identifiers are network, node, and socket number. The network number identifier enables communication among multiple networks. The node number, identifies the particular node address on the network, and the socket number identifies the particular process within that node.

To more particularly describe the significance of the socket number, multiple processes may be running under a single node at any given time. For example, the popular Microsoft Windows® multi-tasking operating system can accommodate several tasks or processes at any given time, on the same physical node. To uniquely associate communication packets with each of these processes, a unique socket number is used. For illustrative purposes, in a preferred embodiment of the present invention, three sequentially addressed sockets are shown associated with each process, and will be described in more detail below.

Referring now to FIGS. 3A and 3B, the packet structure for a request (FIG. 3A) and response (FIG. 3B) packet for the NCP protocol are shown. In connection with FIGS. 3A and 3B, reference is once again made to the cited pages of the November, 1993 issue of *Dr. Dobb's journal* wherein a description of the packet structures for the NCP protocol are set forth in sufficient detail to enable one of ordinary skill in the art to effectuate the concepts and teachings of the present invention as described herein. Briefly, however, the request packet depicts the information contained in the communication datagram transmitted from a client to the server, whereas the response packet depicts the information contained in a communications datagram transmitted from the server to the requesting client.

Figure 4:
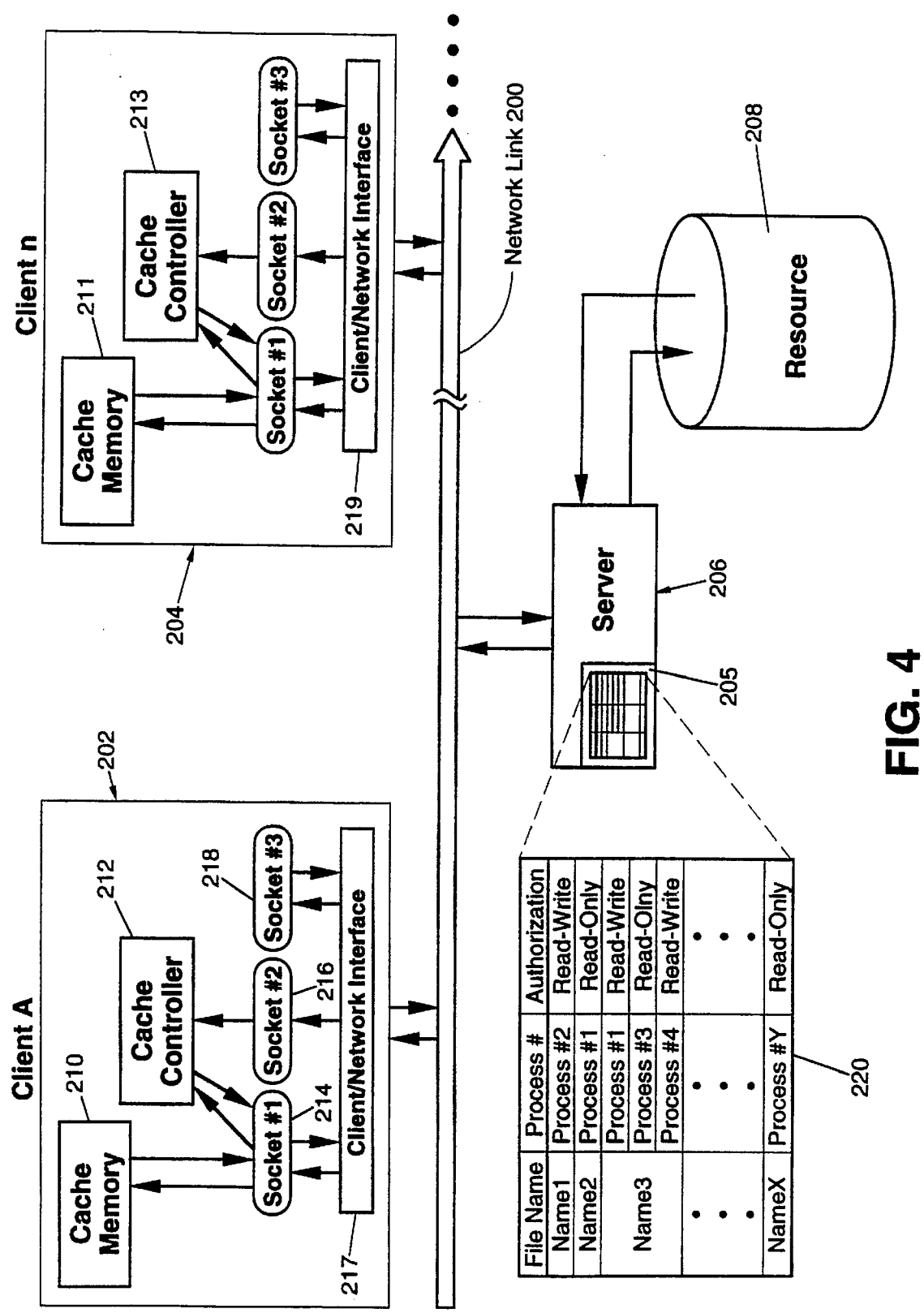
FIG. 4 is a schematic diagram illustrating the primary elements of the network of FIG. 1.

Having now described the environment in which the present invention operates, the discussion will now be directed to the detailed operation of the present invention. FIG. 4 schematically represents the primary network architecture supporting the operation of the present invention. A network link 200 provides the medium for communication among a plurality (2 to n) of clients 202 and 204 and a file server 206. In the preferred embodiment, the clients 202 and

204 are personal computer workstations operating in a Microsoft windowing environment and contain cache memories 210 and 211 and cache controllers 212 and 213, respectively. It should be appreciated that the network link is not limited to any tangible medium but, indeed, could comprise twisted pair, co-axial, or fiber-optic cabling, as well as satellite communication. A resource 208, such as a disk drive, is located at the server 206 and provides permanent storage of files for shared usage among the clients throughout the network.

According to the standard NCP protocol, three sockets are set up by software each time a network process is initiated. As shown in the FIG. 4, sockets 214, 216 and 218 serve as ports through which communication packets are transferred between the process running on the client 202 and server 206. More particularly, socket 214 and 218 are ports providing bi-directional communication between the client 202 and server 206, whereas socket 216 is a port that supports only uni-directional transfers of communication packets from the server 206 to the client 202. Although both sockets 214 and 218 support bi-directional communication, socket 214 (the main socket) provides general bi-directional communication, while socket 218 supports only a specific type of communication, as will be described below.

The second socket 216, called the message socket, is generally used by the server to notify the client if it has a message (for example, from another client on the network) for the client. If the client desires the contents of the message, the client makes such a request to the server via the main socket 214. As described in more detail below, this second socket 216 has been adapted for use by the server 206 in connection with the present invention to submit requests to the client 202, namely to release its opportunistic lock on files that are maintained in the client cache memory 210.

A third socket 218, called a watchdog socket, is adapted to receive inquiries from the server as to the status of a process or client connection. Specifically, in situations where a process, although presently active, has not communicated with the server for long period of time, the server 206 will submit a request to the third socket 218 inquiring whether the client wishes to terminate the process. If the client 202 wishes to maintain the process, it informs the server by responding through the same socket 218. Otherwise, the server 206 terminates the connection with that process.

As previously described, the identifier sockets are set up by software and serve as communication ports through which network transfer packets are exchanged between client and server. As should be appreciated by one of ordinary skilled in the art, a hardware interface 217 and 219 at each client is provided to buffer the information or data exchange between the client and server. Broadly, the interface 217 operates to receive data transmitted by the server by monitoring the data being transmitted across the network link 200. Upon identifying an IPX data packet in which the network, node, and socket identifiers (as shown in FIG. 2) correspond to a socket under a process running at client A, then the interface 217 will capture this data packet from the network link 200 and transmit it to the appropriate socket. Similarly, the interface 217 will take a transmission from socket #1, format it for transmission over the network link 200, and place it on the network for transmission to another node.

Generally, the file management system of the present invention operates in the following manner. A process requests files by submitting a request to the server 206 through its first socket. The server 206 maintains a file table 220, which is stored in the internal memory 205 of the server 206 and contains a current list of open files to which clients have access and information on how the files are being accessed. When the server 206 receives a request for access to a file from a process, the server 206 examines its file table 220 to determine whether access to the requested file should be granted.

By way of example, the file table 220 of FIG. 4 shows that "Name1" is presently being accessed with read-write authority by process #2; file "Name2" is presently being accessed with read-only authorization by process #1; file "Name3" is presently being accessed by processes #1, #3 and #4; and file "NameX" is being accessed by process #Y with read-only authorization. File table 220 also implicitly identifies which files are opportunistically locked by the processes and which files are being maintained by the server. For example, since file "Name1" is being accessed by only one process (process #2), it is being maintained in the local cache memory of the client running process #2. Similarly, only process #1 has access to file "Name2." Accordingly, process #1 is given an opportunistic lock on file "Name2" and maintains the file in the local cache memory of its client. As for file "Name3," it is being accessed by multiple processes, and therefore, it is maintained and located at the server 206. Although not required, the file "Name3" is stored in the internal memory space 205 of the server 206. It should be appreciated that storing file "Name3" in the internal memory to server 206, rather than the resource 208, saves file transfers along the link connecting the server 206 to its resource 208.

Alternatively, the file table 220 may explicitly maintain information regarding the opportunistic locked status of a file. For example, an oplock flag or a field in the file table 220 may be set or maintained to indicate whether a file is opportunistically locked or maintained at the server or whether a particular process had or desired an opportunistic lock on a file. The maintenance of such flags or fields represent a trade-off between the memory and overhead requirements to store and maintain the file table 220 and the speed at which the determination of oplock status of a file is obtainable.

With the file table 220 in the state described above, if process #1 is running on client A and another process running on a different client requested the file "Name2" for read-write access, the server 206 would recognize from the file table 220 that file "Name2" was presently in the local memory space of process #1. The server 206 would then transmit a request to the second socket 216 of process #1 to relinquish control of file "Name2". Process #1, upon receiving the request through the second socket 216, would then flush file "Name2" from its cache memory 210 and instruct the server 206 through its first socket 214 that it had relinquished the file. It is important to note that the file need not be transmitted over the network to the server 206 since process #1 had read-only access to the file and no changes would have been made to the file. In contrast, if the process had requested access to file "Name1", then process #2 would need to transmit any of the modified portions of the file from its cache 210 to the server 206.

If a process requests access to a file which is not in the file table 220, the server 206 recognizes that the file is not presently being accessed by any other processes. Accordingly, the process is given an opportunistic lock on the file and the file table 220 is updated accordingly.

The foregoing examples generally illustrate the manner in which file maintenance is maintained in a system of the present invention. Reference will now be made to the more specific operation illustrating the file control features of the present invention.

Figure 5:
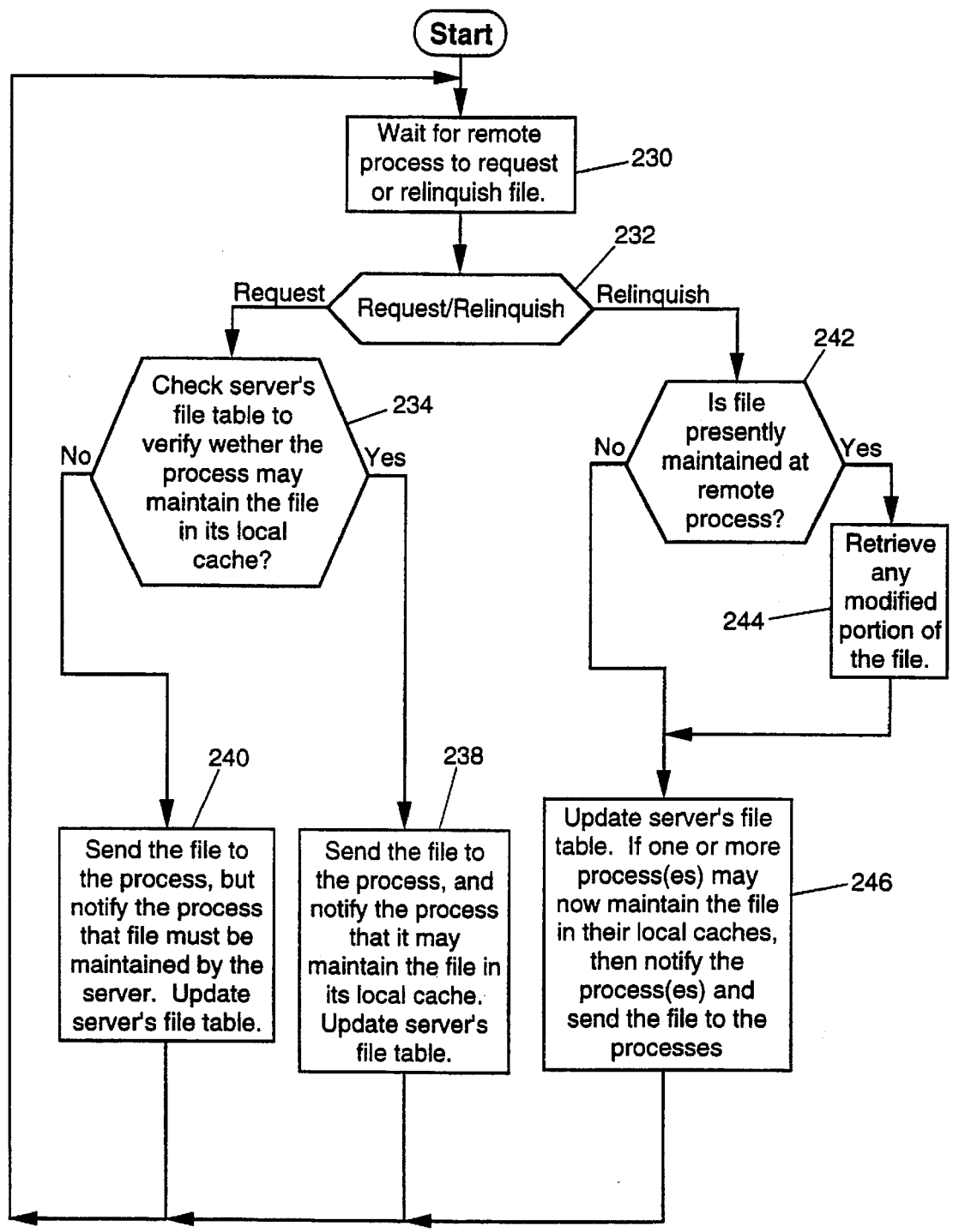
FIG. 5 is a top-level flowchart depicting the top level operation of the file management system of the present invention.

FIG. 5 shows a top level flowchart of the server routine for the present invention. The routine operates in such a manner that the server waits for a remote process to either request or relinquish access to a file stored at the server resource 208 (step 230). Upon receiving an appropriate signal, the server 206 then determines, at step 232, whether the remote process is requesting or relinquishing access to a file. If the process has requested access to a file, the server 206 checks its file table 220 to determine whether the requesting process may be given an opportunistic lock on the requested file (step 234). An opportunistic lock is granted if 1) the requesting process is the only process requesting access to the file, or 2) the requesting process is seeking read-only access to the file and no other processes have read-write access to the file. If the opportunistic lock is granted, then the server 206 transmits the file to the process using the first socket of the requesting process, updates its file table 220 to indicate the requesting process has access to the file and the type of access (e.g., read-only or read-write); and notifies the requesting process that it may maintain the file locally, in its local cache or other storage resource available to it (step 238). If an opportunistic lock is not granted, then the server 206 notifies the remote process that the file must be maintained at the server 206 (step 240). The server 206, nevertheless, updates its file table 220 to indicate that the process has access to the file and the type of file access, and transmits the file to the first socket of the requesting process.

If, at step 232, the server 206 determines that the remote process is relinquishing access to a file, then the server examines its file table 220 to determine whether the relinquishing process has opportunistic access to the file, i.e. whether the file is presently maintained in the cache of the relinquishing process (step 242). If so, the server 206 retrieves any modified portion of the file through the first socket of the remote process and updates its file table 220 accordingly (step 244).

Whether the relinquishing process had opportunistic access to the file or not, the act of relinquishing a file by one process may effect how other processes may now access the file. Accordingly, the server 206 updates and examines its file table 220 to determine if any other processes which are currently accessing the file may be granted opportunistic access to the file, i.e. whether the file should be transmitted out to the local cache of one or more other clients (step 246).

Figure 6A:
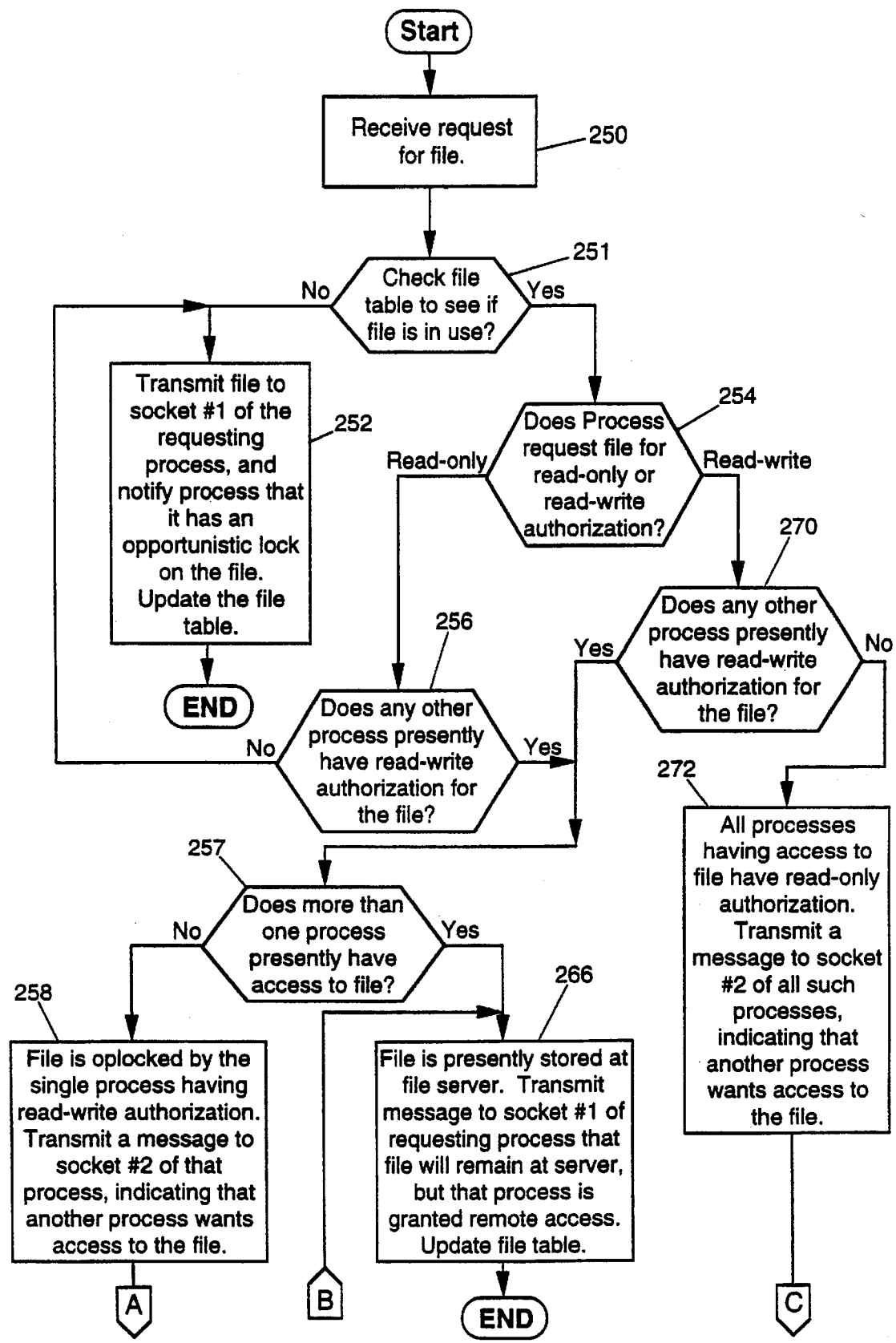
FIGS. 6A–6B collectively are a flowchart more particularly depicting the operation of the file management system of the present invention upon receiving a request by a remote client, for access to a file stored at the server.
Figure 6B:
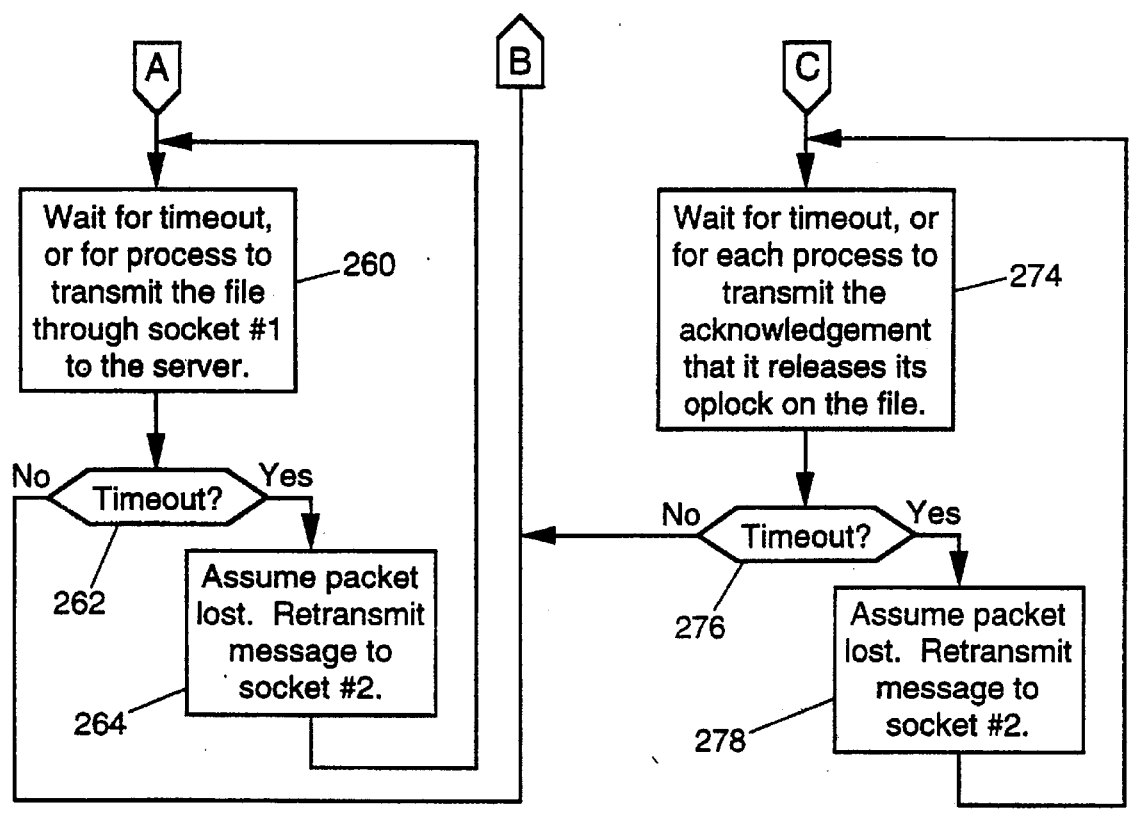

FIGS. 6A–6B show a detailed software flowchart setting forth the routine of the server 206 for allocating files when it receives a request. Upon receiving a request for a file (step 250), the server 206 examines its file table 220 to determine whether the file is in use (step 251). If the file is not in the file table 220, it is not presently being accessed by any other process, and accordingly, the server 206 transmits the file to the first socket of the requesting process and notifies the requesting process that it has been granted an opportunistic lock on the file (step 252). The server 206 will then update its file table indicating that the remote process has access to the file and indicating the manner in which the process has access, i.e. read-only or read-write authorization.

If the server 206 determines at step 251 from examining its file table 220 that the file is presently being accessed by other remote processes, it must then ascertain whether the requesting process has requested read-write or read-only authorization (step 254). If the requesting process has requested the file for read-only authorization, then the server 206 determines from the file table whether any other process presently has read-write authorization for the file (step 256). If not, the server 206 recognizes that the other processes have read-only opportunistic locks on the requested file, and accordingly, transmits the file to the first socket of the requesting process; notifies the requesting process that it has been granted an opportunistic lock on the file; and updates its file table as described in connection with step 252.

If the server 206 determines at step 256 that another process presently has read-write access to the file, its actions will depend upon whether more than one process presently has access to the file. If the file server 206 determines at step 257 that only a single remote process has access to a file with read-write authorization, then the file is being maintained in the local memory of the single remote process by way of an opportunistic lock. In such a case, the server 206 transmits a message to the second socket of the single remote process indicating that another process wants access to the file and requesting that process to transmit the file back to the server 206 (step 258). The server 206 then waits for the single remote process to transmit the file back to the server 206 (step 260). In the preferred embodiment, the remote process will transmit only those portions of the file that have been modified since retrieving the file from the server 206, thereby minimizing traffic over the network link. If the server 206 has waited some predetermined period of time (e.g. 50 milliseconds) without receiving the file it will timeout at step 262, assume that a message packet was lost, and retransmit the request to the remote process (step 264).

When the requested file is transmitted back to the server 206 through the first socket of the single remote process, the server 206 transmits a message to the first socket of the requesting process that the file is available at the server 206 and that the requesting process is granted remote access to the file (step 266). The server 206 also update its file table 220 accordingly.

If the file server 206 at step 254 determines that the remote process requests read-write authorization for the file, then it checks its file table 220 to see if any other process presently has read-write access to the file (step 270). If not, then the file is being maintained in the local memories of the other remote processes by way of an opportunistic lock. Accordingly, the server 206 transmits a message to the second socket of each of these processes, requesting each process to relinquish opportunistic access and control of the requested file (step 272). The server 206 then waits for each process so requested to transmit an acknowledgement through its first socket that it has relinquished opportunistic access and control of the file (step 274). It should be appreciated, that since these processes have read-only authorization to the file, that the file may simply be flushed from their cache memories, and does not need to be transmitted over the network link. If all such requested processes have not responded to the server 206 within a pre-determined period of time (e.g. 50 milliseconds), the server 206 will timeout and assume that a message packet was lost in communicating with any such non-responding processes (step 276). For these processes, the server 206 will retransmit the message packet to socket #2 (step 278). Once all requested process have notified the server 206 that they have relinquish opportunistic access and control of the file, the server 206 transmits a message to the first socket of the requesting process that the file is available at the server 206 and that the requesting process is granted remote access to the file (step 266). The server 206 also update its file table 220 accordingly.

If, however, another process does have read-write authorization (step 270), then the server determines whether more than one process has present access to the file (step 257). From this point, operation of the invention will proceed as previously described.

Figure 7A:
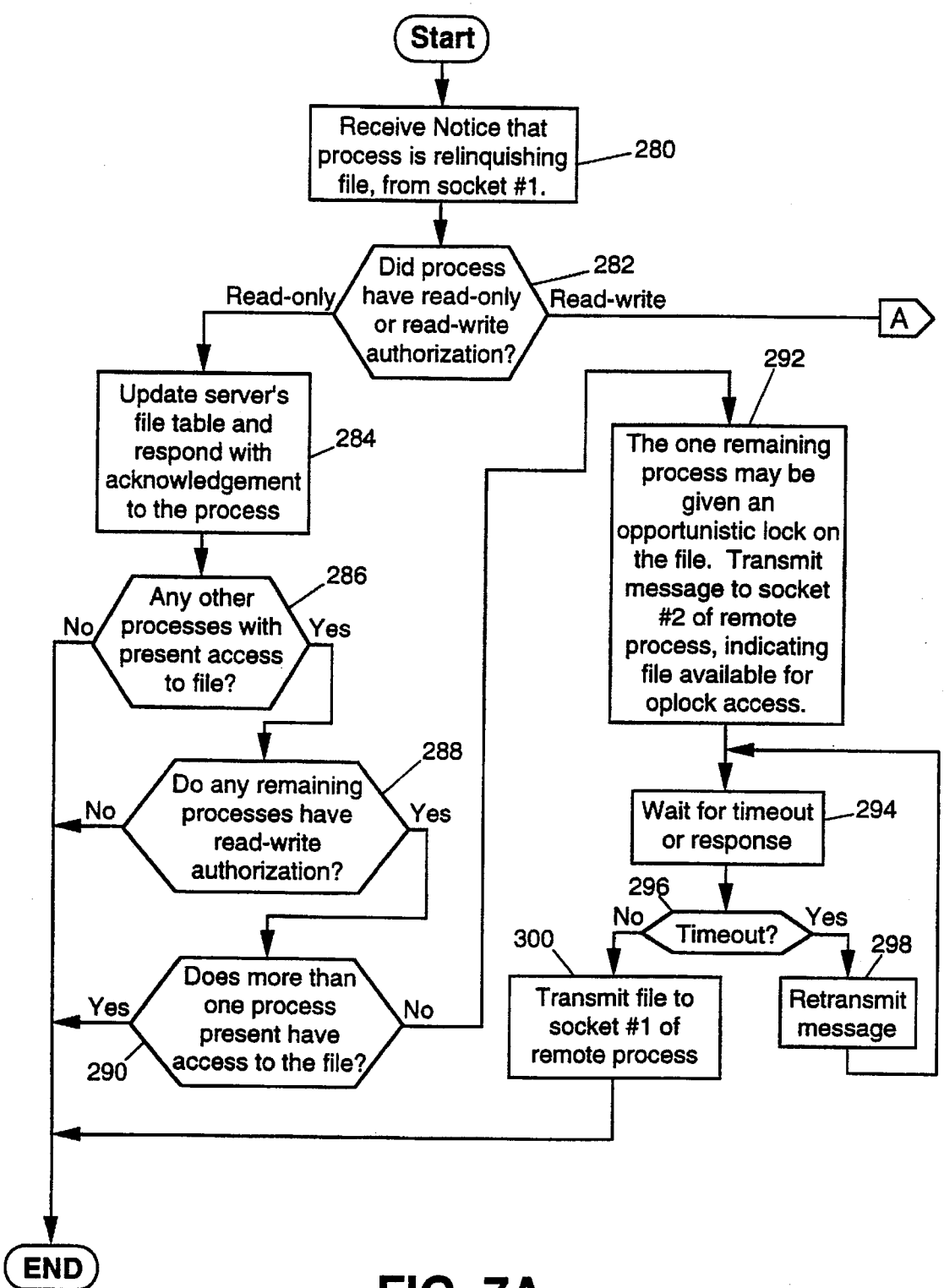
FIGS. 7A–7B collectively are flowcharts depicting the operation of the file management system of the present invention upon receiving notification from a remote client that the client is relinquishing access to a file.
Figure 7B:
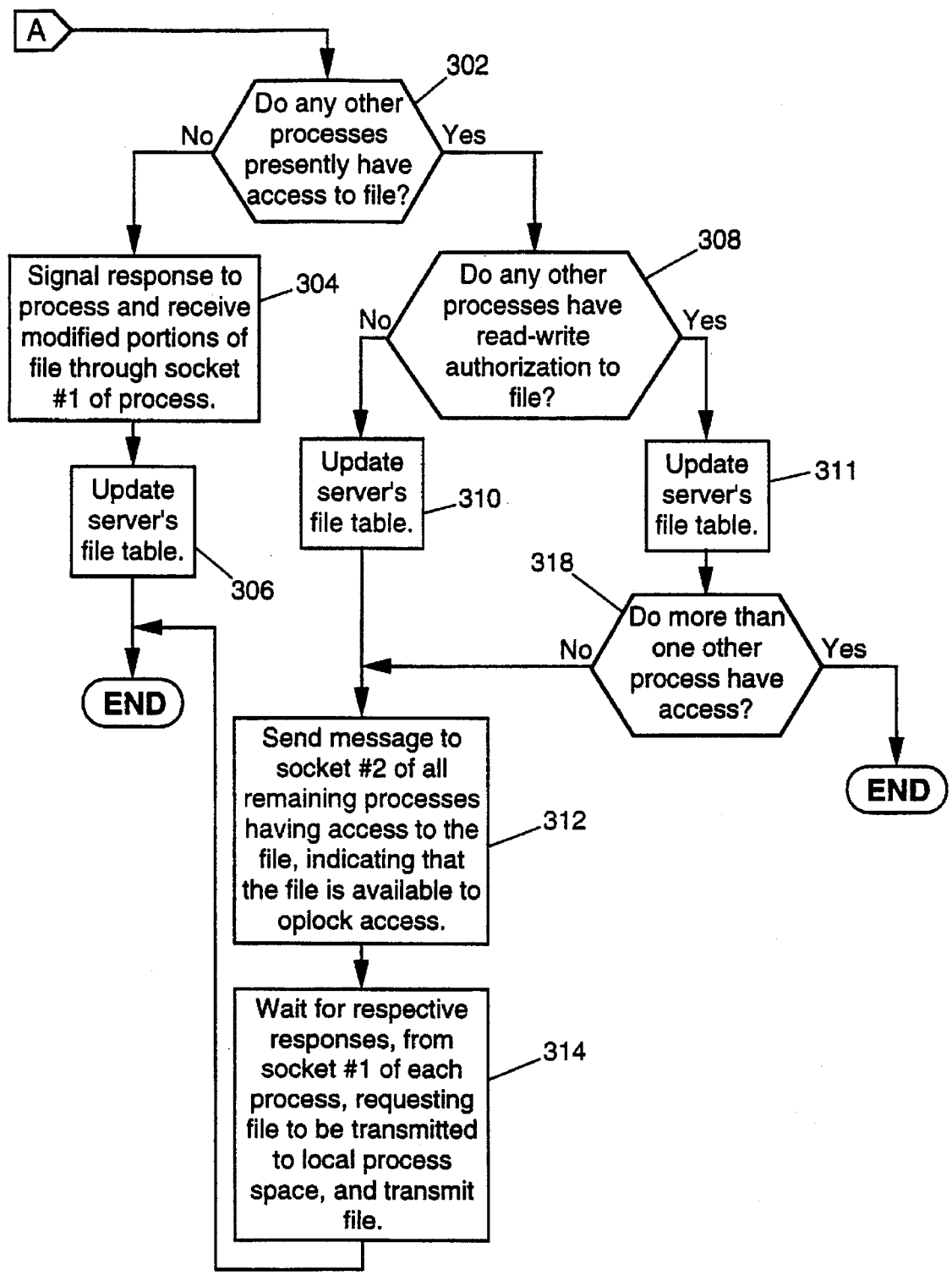

Reference is now made to FIGS. 7A and 7B, which together show the software flowchart for the routine of the server 206 when a remote process instructs the server 206 that it is relinquishing access to a file. In such a case, the file server 206 checks its file table to determine if the relinquishing of the file affects the manner in which other processes may access the file. For example, if a file is being accessed by a process having read-write access and a second process having read-only access, there can be no opportunistic lock on the file. However, if either process relinquishes the file, then the remaining process will be granted an opportunistic lock to the file.

At step 280, the remote process transmits a notice through its first socket to the server 206 that it is relinquishing access to a file, e.g. closing the file. The server 206 then examines the file table 220 to determine whether that process had read-only or read-write authorization to the file (step 282). If the process had read-only authorization, the server 206 updates its file table 220 and responds to the relinquishing process that it has received notification that the file has been relinquished (step 284). In such a case, the file is simply flushed from the local cache memory of the client and no network transmission of the file is necessary.

It should be appreciated that the routine does not end at this point, but rather, consistent with the system's dynamic file allocation, the server 206 determines whether access to the file should be modified. Specifically, the server 206 analyzes the file table 220 for two preliminary inquiries. The first is whether any other process presently has access to the file (step 286), and the second is whether any such processes have read-write authorization (step 288). If the answer to either of these inquires is no, then no modifications to the opportunistic access of the file is necessary and the file relinquish routine is complete.

Similarly, if the server 206 determines at step 290 that more than one other remote process presently has access to the file, and at least one such process has read-write authorization (step 290), then the file is presently maintained at the server 206 and no modifications to the opportunistic access is necessary.

If the server determines at step 290 that only one other process has present access to the file, and such access is read-write authorization, then the file is also presently stored at the server 206. However, since the relinquishing process is relinquishing access to the file, the file having read-write access remains the only process having access to the file. Therefore, the one remaining process is granted an opportunistic lock and the file is transmitted to the process to be maintained at its local cache memory space (step 292). To effectuate this transfer, the server 206 transmits a message to the second socket of the remaining process, indicating that the file is available for an opportunistic lock. The server 206 then waits at step 294 for that process to request the file to be transmitted. If a timeout occurs at step 296, then the server 206 assumes that a message packet was lost and will retransmit the message (step 298). When the server 206 receives a request from the remaining process to transmit the file, then the server 206 transmits the file to the first socket of the remote process (step 300).

In keeping with the description of the file relinquishing routine, if the file server determines at step 282 that the relinquishing process had read-write access to the file, then the server 206 must determine from the file table 220 whether any other processes presently have access to the file (step 302 of FIG. 7B). If not, the file is presently being maintained in the cache memory of the relinquishing process by way of an opportunistic lock, and the server 206 must retrieve any modified portions of that file. Accordingly, the server 206 sends an acknowledgement of the relinquishing of the file to the process and receives any modified portions of the file through the first socket of the relinquishing process (step 304). The server 206 then updates the file table 220 to reflect that no processes presently have access to the file (step 306). The file is then stored at the resource 208 of the server 206 and the routine is exited.

If, however, the file server at step 302 determines that other processes presently do have access to the file, then the server 206 must ascertain from the file table 220 whether any such processes have read-write authorization (step 308). If not, then all remaining processes have read-only authorization and each of the processes may be granted an opportunistic lock on the file. Accordingly, the server 206 updates its file table 220 at step 310 and sends a message to the second socket of all remaining processes having access to the file, indicating that the file may now be transmitted to their local cache memory (step 312). The server 206 then waits for respective responses from the first socket of each such process requesting the file to be transmitted to their local memory space (step 314). Upon receiving these requests, the server 206 transmits the file through the first socket of each such process.

If the server 206 determines at step 308 that one or more processes do in fact have read-write authorization to the file, the server 206 must first update the file table (step 311) then ascertain from the file table 220 whether more than one process presently has access to the file (step 318). If more than one other process presently has access to the file, then no opportunistic locks are possible, the file remains stored at the server 206, and the routine is exited. If, however, only one other process presently has access to the file, even though that access is with read-write authorization, the process is granted an opportunistic lock to the file which is transmitted to the cache memory space of that process in the manner described at steps 312 and 314 above.

The foregoing description of the preferred embodiments of the invention has been presented for purposes of illustration and description. It is not intended to be exhaustive or to limit the invention to the precise form disclosed. Obvious modifications or variations are possible in light of the above teachings. The embodiment discussed was chosen and described to provide the best illustration of the principles of the invention and its practical application to thereby enable one of ordinary skill in the art to utilize the invention in various embodiments and with various modifications as are suited to the particular use contemplated. All such modifications and variations may be within the scope of the invention as determined by the appended claims when interpreted in accordance with the breadth to which they are fairly, legally, and equitably entitled.

What is claimed is:

1. A method for allocating and managing files in a multi-user network environment of the type having at least one server with a file directed for shared usage, and a plurality of clients interconnected with the server through a network link, each client having at least two identifier sockets, wherein a first identifier socket is configured for bi-directional communication between the client and the server and a second identifier socket is configured for unidirectional communications initiated by the server, the method comprising the steps of:

transmitting by the client through said first identifier socket a request to the server for the file;

determining by the server whether the file is available to the client for opportunistic access;

transmitting by the server the file to the requesting client through the first identifier socket;

notifying the client by the server whether the client has an opportunistic lock on the file or whether the file must be maintained at the server; and sending by the server a message to the client through the second identifier socket that the client must relinquish the opportunistic access to the file when the server determines that opportunistic access is no longer available.

2. The method of claim 1 further comprising the steps of:

transmitting by the client through the first identifier socket a notification request to the server that the client is relinquishing access to the file;

determining by the server whether the relinquished file is available for opportunistic access by a second client accessing the file; and notifying the second client by the server through the second identifier socket of the second client that the file is available for opportunistic access.

3. The method of claim 1 further comprising the step of relinquishing by the client the opportunistic lock on the file by transmitting to the server any portions of the file that have been modified by the client.

4. The method of claim 1 wherein the step of determining whether the file is available to the client for opportunistic access includes the step of referencing an opportunistic file table maintained by the server comprising information related to which clients have open access to the file and whether the file is open for read-only or read-write access.

5. The method of claim 2 wherein the step of determining whether the file is available to a second client for opportunistic access includes the step of referencing an opportunistic file table maintained by the server comprising information related to which clients have open access to the file and whether the file is open for read-only or read-write access.

6. A file allocation and management system for a multi-user network environment of the type having at least one server which maintains a file for shared usage at the server and two or more clients that communicate in a request/response protocol, the system comprising:

a plurality of identifier sockets at each client, wherein a first identifier socket is configured for bi-directional communication with the server, the bi-directional communication being initiated by a request from the client, and a second identifier socket is configured to receive unidirectional communications initiated by the server;

a cache memory at each client, the cache memory being in communication with the server through the first identifier socket, wherein the file is transported between the cache memory and server through the first identifier socket; and a cache controller for controlling the file transport and storage within the cache memory, both the cache controller and the server being disposed to communicate so as to controllably transport the file between the cache memory and the server, wherein the file is transported between the cache memory and the server in dependance upon the number of clients having open access to the file, and whether the file is open for read-only or read-write access.

7. The file allocation and management system of claim 6 wherein the second identifier socket of the clients are configured to receive communication from the server related to whether the clients are permitted opportunistic access to the file.

8. The file allocation and management system of claim 7 wherein said communication from the server includes a request by the server for a client to release an opportunistic lock on the file.

9. The file allocation and management system of claim 8 wherein said client is configured to release the opportunistic lock on the file by flushing its cache and transmitting to the server any portions of the file that have been modified by the client.

10. The file allocation and management system of claim 6 wherein said server maintains an opportunistic file table comprising information related to which clients have said open access to the file and whether the file is open for read-only or read-write access.

11. The file allocation and management system of claim 10 wherein said server determines if opportunistic access to the file is possible by one or more clients by referencing said opportunistic file table when a client relinquishes access to the file.

12. A client network driver usable in a multi-user network environment of the type having at least one server which maintains a file for shared usage at the server and two or more clients that communicate in a request/response protocol over a network link, the client network driver comprising:

a client network interface operable to receive data packets comprising the file from the network link through a first identifier socket which is configured for bi-directional communication with the server, the bi-directional communication being initiated by a request from the client, and a controller operable to store and maintain the file received by the client network interface through the first identifier socket on a local storage device of the client, and further operable to flush the file from the local storage device in response to a unidirectional communication initiated by the server through a second identifier socket directing the client to release an opportunistic lock on the file.

* * * * *